United States Patent [19]
Muhich et al.

[11] Patent Number: 5,784,604
[45] Date of Patent: Jul. 21, 1998

[54] METHOD AND SYSTEM FOR REDUCED RUN-TIME DELAY DURING CONDITIONAL BRANCH EXECUTION IN PIPELINED PROCESSOR SYSTEMS UTILIZING SELECTIVELY DELAYED SEQUENTIAL INSTRUCTION PURGING

[75] Inventors: John Stephen Muhich; Terrence Matthew Potter; Steven Wayne White, all of Austin, Tex.

[73] Assignee: International Business Machines Corporation, Armonk, N.Y.

[21] Appl. No.: 959,183

[22] Filed: Oct. 9, 1992

[51] Int. Cl.$^6$ ........................................ G06F 9/00
[52] U.S. Cl. ............... 395/585; 364/261.3; 364/DIG. 1
[58] Field of Search .................... 395/800, 375, 395/585; 364/261.3, DIG. 1

[56] References Cited

U.S. PATENT DOCUMENTS

| | | | |
|---|---|---|---|
| 4,200,927 | 4/1980 | Hughes et al. | 395/375 |
| 4,974,154 | 11/1990 | Matsuo | 395/375 |
| 4,974,155 | 11/1990 | Dulong et al. | 395/375 |
| 5,127,091 | 6/1992 | Boufarah et al. | 395/375 |
| 5,163,140 | 11/1992 | Stiles et al. | 395/425 |
| 5,230,068 | 7/1993 | Van Dyke et al. | 395/375 |
| 5,237,666 | 8/1993 | Suzuki et al. | 395/375 |
| 5,287,467 | 2/1994 | Blaner et al. | 395/375 |

*Primary Examiner*—Alyssa H. Bowler
*Assistant Examiner*—John E. Harrity
*Attorney, Agent, or Firm*—Mark E. McBurney; Andrew J. Dillon

[57] ABSTRACT

A method and system are disclosed for reducing run-time delay during conditional branch instruction execution in a pipelined processor system. A series of queued sequential instructions and conditional branch instructions are processed wherein each conditional branch instruction specifies an associated conditional branch to be taken in response to a selected outcome of processing one or more sequential instructions. Upon detection of a conditional branch instruction within the queue, a group of target instructions are fetched based upon a prediction that an associated conditional branch will be taken. Sequential instructions within the queue following the conditional branch instruction are then purged and the target instructions loaded into the queue only in response to a successful a retrieval of the target instructions, such that the sequential instructions may be processed without delay if the prediction that the conditional branch is taken proves invalid prior to retrieval of the target instructions. Alternately, the purged sequential instructions may be refetched after loading the target instructions such that the sequential instructions may be executed with minimal delay if the prediction that the conditional branch is taken proves invalid after loading the target instructions. In yet another embodiment, the sequential instructions within the queue following the conditional branch instruction are purged only in response to a successful retrieval of the target instructions and an imminent execution of the conditional branch instruction.

16 Claims, 6 Drawing Sheets

| Stage | Cycle 1 | 2 | 3 | 4 | 5 | 6 | 7 |
|---|---|---|---|---|---|---|---|
| Queue 3 | bc | | T2 | T3 | S3 | S4 | S5 |
| Queue 2 | cmp | | T1 | T2 | S2 | S3 | S4 |
| Queue 1 | alu | cmp | T0 | T1 | S1 | S2 | S3 |
| Decode | alu | alu | cmp | T0 | S0 | S1 | S2 |
| Execute | alu | alu | alu | cmp | | S0 | S1 |
| W/B | alu | alu | alu | alu | cmp | | S0 |

Prior Art

| Stage | Cycle 1 | 2 | 3 | 4 | 5 | 6 | 7 |
|---|---|---|---|---|---|---|---|
| Queue 3 | bc | S1 | T2 | T3 | | S3 | S4 |
| Queue 2 | cmp | S0 | T1 | T2 | | S2 | S3 |
| Queue 1 | alu | cmp | T0 | T1 | | S1 | S2 |
| Decode | alu | alu | cmp | T0 | | S0 | S1 |
| Execute | alu | alu | alu | cmp | | | S0 |
| W/B | alu | alu | alu | alu | cmp | | |

| Stage   | Cycle 1 | 2   | 3   | 4   | 5   | 6   | 7   |
|---------|---------|-----|-----|-----|-----|-----|-----|
| Queue 3 | bc      | S1  | S2  | T3  |     | S3  | S4  |
| Queue 2 | cmp     | S0  | S1  | T2  |     | S2  | S3  |
| Queue 1 | alu     | cmp | S0  | T1  |     | S1  | S2  |
| Decode  | alu     | alu | cmp | T0  |     | S0  | S1  |
| Execute | alu     | alu | alu | cmp |     |     | S0  |
| W/B     | alu     | alu | alu | alu | cmp |     |     |

| Stage   | Cycle 1 | 2   | 3   | 4   | 5   | 6   | 7   |
|---------|---------|-----|-----|-----|-----|-----|-----|
| Queue 3 | bc      | S1  | T2  | T3  | S3  | S4  | S5  |
| Queue 2 | cmp     | S0  | T1  | T2  | S2  | S3  | S4  |
| Queue 1 | alu     | cmp | T0  | T1  | S1  | S2  | S3  |
| Decode  | alu     | alu | cmp | T0  | S0  | S1  | S2  |
| Execute | alu     | alu | alu | cmp |     | S0  | S1  |
| W/B     | alu     | alu | alu | alu | cmp |     | S0  |

METHOD AND SYSTEM FOR REDUCED RUN-TIME DELAY DURING CONDITIONAL BRANCH EXECUTION IN PIPELINED PROCESSOR SYSTEMS UTILIZING SELECTIVELY DELAYED SEQUENTIAL INSTRUCTION PURGING

BACKGROUND OF THE INVENTION

1. Technical Field

The present invention relates in general to improved data processing systems and in particular to methods and systems for reducing run-time delay during conditional branch instruction execution. Still more particularly, the present invention relates to methods and systems for reducing delay resulting from unsuccessful prediction of conditional branch instructions in a pipelined processor data processing system.

2. Description of the Related Art

Designers of modern state-of-the-art data processing systems are continually attempting to enhance the performance aspects of such systems. One technique for enhancing data processing system efficiency is the achievement of short cycle times and a low Cycle's-Per-Instruction (CPI) ratio. An excellent example of the application of these techniques to an enhanced data processing system is the International Business Machines Corporation RISC System/6000 (RS/6000) computer. The RS/6000 system is designed to perform well in numerically intensive engineering and scientific applications as well as in multi-user, commercial environments. The RS/6000 processor employs a multiscalar implementation, which means that multiple instructions are issued and executed simultaneously.

The simultaneous issuance and execution of multiple instructions requires independent functional units that can execute concurrently with a high instruction bandwidth. The RS/6000 system achieves this by utilizing separate branch, fixed point and floating point processing units which are pipelined in nature. In such systems a significant pipeline delay penalty may result from the execution of conditional branch instructions. Conditional branch instructions are instructions which dictate the talking of a specified conditional branch within an application in response to a selected outcome of the processing of one or more other instructions. Thus, by the time a conditional branch instruction propagates through a pipeline queue to an execution position within the queue, it will have been necessary to load instructions into the queue behind the conditional branch instruction prior to resolving the conditional branch, in order to avoid run-time delays.

One attempt at minimizing this run-time delay in pipelined processor systems involves the provision of an alternate instruction queue. Upon the detection of a conditional branch instruction within the primary instruction queue, the sequential instructions following the conditional branch instruction within the queue are immediately purged and loaded into the alternate instruction queue. Target instructions for a predicted conditional branch are then fetched and loaded into the primary instruction queue. If the predicted conditional branch does not occur, the sequential instructions are fetched from the alternate instruction queue and loaded into the primary instruction queue. While this technique minimizes run-time delay, it requires the provision of an alternate instruction queue and a concomitant increase in the hardware assets required.

Another attempt at minimizing run-time delay in pipelined processor systems involves the utilization of a compiler to insert large numbers of instructions into the queue between a conditional branch instruction and the instruction which generates the outcome which initiates the conditional branch. This technique attempts to resolve the conditional branch and place the appropriate target instructions or sequential instructions into the instruction queue prior to execution of the conditional branch instruction during the delay between execution of the instruction which generates the outcome which initiates the conditional branch and the execution of the conditional branch instruction. In theory, this technique will minimize run-time delay without requiring the provision of an alternate instruction queue; however, it is difficult to insert sufficient numbers of instructions into the queue to accomplish the necessary delay.

Thus, it should be apparent that need exists for a method and system which minimizes delay resulting from unsuccessful predictions of conditional branch instructions in a pipelined processor without requiring the provision of an alternate instruction queue.

SUMMARY OF THE INVENTION

It is therefore one object of the present invention to provide an improved data processing system.

It is another object of the present invention to provide an improved method and system for reducing run-time delay during conditional branch instruction execution in a data processing system.

It is yet another object of the present invention to provide an improved method and system for reducing delay resulting from an unsuccessful prediction of a conditional branch instruction in a pipelined processor data processing system.

The foregoing objects are achieved as is now described. The method and system of the present invention may be utilized to reduce runtime delay during conditional branch instruction execution in a pipelined processor system. A series of queued sequential instructions and conditional branch instructions are processed wherein each conditional branch instruction specifies an associated conditional branch to be taken in response to a selected outcome of processing one or more sequential instructions. Upon detection of a conditional branch instruction within the queue, a group of target instructions are fetched based upon a prediction that an associated conditional branch will be taken. Sequential instructions within the queue following the conditional branch instruction are then purged and the target instructions loaded into the queue only in response to a successful retrieval of the target instructions, such that the sequential instructions may be processed without delay if the prediction that the conditional branch is taken proves invalid prior to retrieval of the target instructions. Alternately, the purged sequential instructions may be refetched after loading the target instructions, such that the sequential instructions may be executed with minimal delay if the prediction that the conditional branch is taken proves invalid after loading the target instructions. In yet another embodiment, the sequential instructions within the queue following the conditional branch instruction are purged only in response to a successful retrieval of the target instructions and an imminent execution of the conditional branch instruction.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a table illustrating the manipulation of instruction queue content in a prior art data processing system utilizing an alternate instruction queue;

FIG. 3 is a table illustrating the manipulation of instruction queue content in accordance with a first embodiment of the method and system of the present invention;

FIG. 5 is a table illustrating the manipulation of instruction queue content in accordance with a second embodiment of the method of system of the present invention;

FIG. 7 is a table illustrating the manipulation of instruction queue content in accordance with a third embodiment of the method and system of the present invention.

DETAILED DESCRIPTION OF PREFERRED EMBODIMENT

Figure 1:
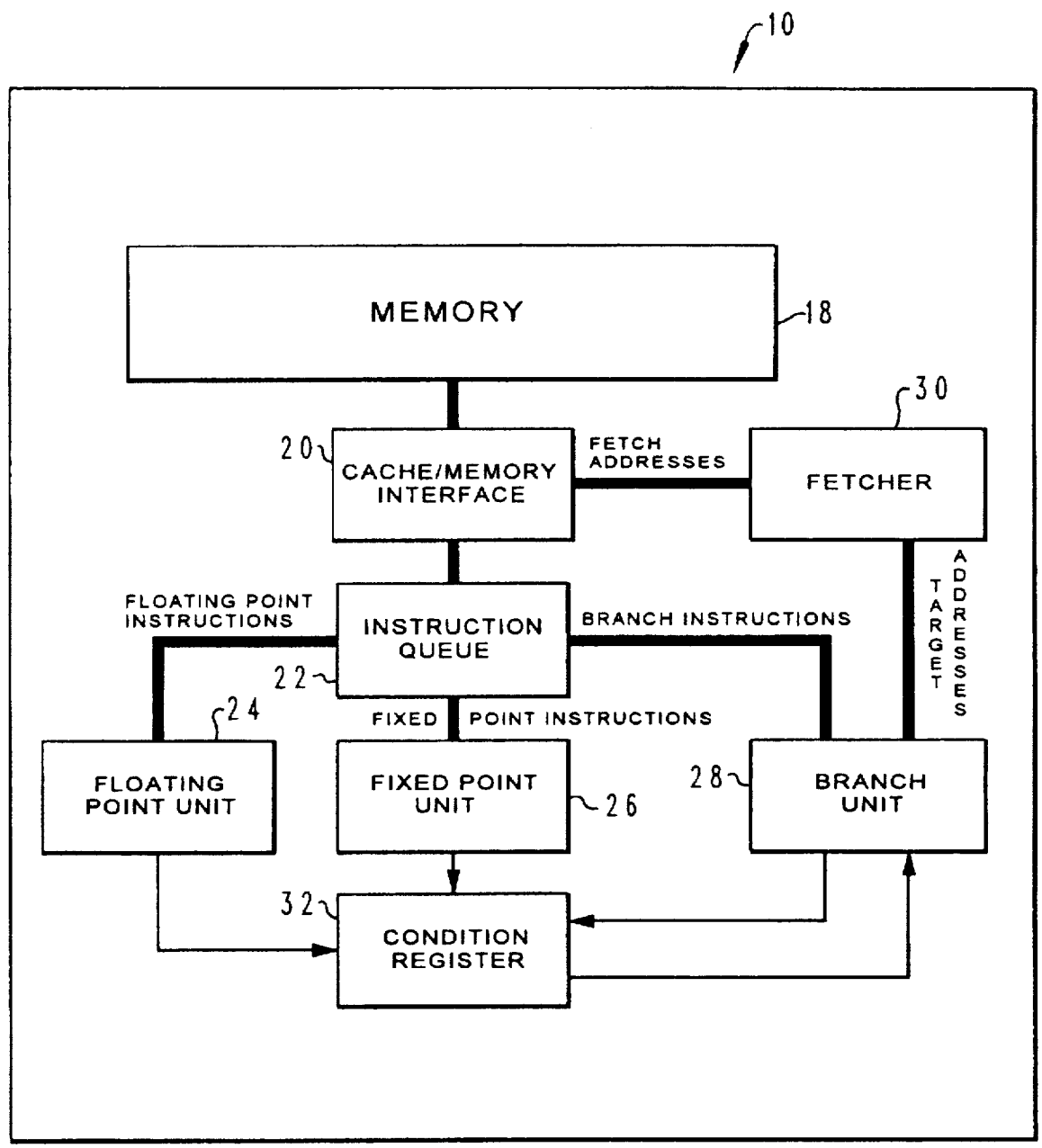
FIG. 1 is a high level block diagram of a multiscalar computer system which may be utilized to implement the method and system of the present invention.

With reference now to the figures and in particular with reference to FIG. 1, there is depicted a high level block diagram of a multiscalar computer system 10 which may be utilized to implement the method and system of the present invention. As illustrated, computer system 10 preferably includes a memory 18 which is utilized to store data, instructions and the like. Data or instructions stored within memory 18 are preferably accessed utilizing cache/memory interface 20 in a method well known to those having skill in the art. The sizing and utilization of cache memory systems is a well known subspecialty within the data processing art and not addressed within the present application. However, those skilled in the art will appreciate that by utilizing modern associative cache techniques a large percentage of memory accesses may be achieved utilizing data temporarily stored within cache/memory interface 20.

Instructions from cache/memory interface 20 are typically loaded into instruction queue 22 which preferably includes a plurality of queue positions. In a typical embodiment of a multiscalar computer system the instruction queue may include eight queue positions and thus, in a given cycle, between zero and eight instructions may be loaded into instruction queue 22, depending upon how many valid instructions are passed by cache/memory interface 20 and how much space is available within instruction queue 22.

As is typical in such multiscalar computer systems, instruction queue 22 is utilized to dispatch instructions to multiple execution units. As depicted within FIG. 1, computer system 10 includes a floating point processor unit 24, a fixed point processor unit 26, and a branch processor unit 28. Thus, instruction queue 22 may dispatch between zero and three instructions during a single cycle, one to each execution unit.

In addition to sequential instructions dispatched from instruction queue 22, so-called "conditional branch instructions" may be loaded into instruction queue 22 for execution by the branch processor. A conditional branch instruction is an instruction which specifies an associated conditional branch to be taken within the application in response to a selected outcome of processing one or more sequential instructions. In an effort to minimize run-time delay in a pipelined processor system, such as computer system 10, the presence of a conditional branch instruction within the instruction queue is detected and an outcome of the conditional branch is predicted. As should be apparent to those having skill in the art when a conditional branch is predicted as "not taken" the sequential instructions within the instruction queue simply continue along a current path and no instructions are altered. However, if the prediction as to the occurrence of the branch is incorrect, the instruction queue must be purged of sequential instruction, which follow the conditional branch instruction in program order and target instructions must be fetched. Alternately, if the conditional branch is predicted as "taken" then the target instructions are fetched and utilized to follow the conditional branch, if the prediction is resolved as correct. And of course, if the prediction of "taken" is incorrect the target instructions must be purged and the sequential instructions which follow the conditional branch instruction in program order must be retrieved.

As illustrated, computer system 10 also preferably includes a condition register 32. Condition register 32 is utilized to temporarily store the results of various comparisons which may occur utilizing the outcome of sequential instructions which are processed within computer system 10. Thus, floating point processor unit 24, fixed point processor unit 26 and branch processor unit 28 are all coupled to condition register 32. The status of a particular condition within condition register 32 may be detected and coupled to branch processor unit 28 in order to generate target addresses, which are then utilized to fetch target instructions in response to the occurrence of a condition which initiates a branch.

Thereafter, branch processor unit 28 couples target addresses to fetcher 30. Fetcher 30 calculates fetch addresses for the target instructions necessary to follow the conditional branch and couples those fetch addresses to cache/memory interface 20. As will should appreciated by those having skill in the art, if the target instructions associated with those fetch addresses are present within cache/memory interface 20, those target instructions are loaded into instruction queue 22. Alternately, the target instructions may be fetched from memory 18 and thereafter loaded into instruction queue 22 from cache/memory interface 20 after a delay required to fetch those target instructions.

The manipulation of instruction queue content in a prior art data processing system utilizing an alternate instruction queue is illustrated in FIG. 2 within table 36 therein. FIGS. 2, 3, 5, and 7 each depict a table illustrating manipulation of instruction queue data content through seven consecutive cycle times. Thus, referring to FIG. 2, it may be seen that at cycle time 1, the instruction queue includes a conditional branch instruction (bc), a compare instruction (cmp) and four arithmetic logic unit (alu) instructions. Upon the detection of the conditional branch instruction within queue 3 of the prior art instruction queue, the sequential instructions within the queue are loaded into an alternate instruction queue (not shown). Thereafter, a request for target instructions associated with the conditional branch is initiated at cycle 2 and those instructions are loaded into the instruction queue at cycle 3. These instructions are based upon the prediction that the conditional branch associated with the conditional branch instruction will be "taken."

Thereafter, at cycle 4, the compare (cmp) instruction has propagated to the execution position within the instruction queue and the conditional branch instruction is "resolved." In the event the resolution of the conditional branch instruction indicates that the conditional branch is "not taken" the sequential instructions previously loaded into the alternate instruction queue are once again loaded into the primary instruction queue, as depicted at cycle 5. Cycles 6 and 7 within the instruction queue of FIG. 2 indicate the subsequent processing of additional sequential instructions. As illustrated, only single empty cycle is present within the instruction queue following the misprediction of the conditional branch instruction. However, as described above, the implementation of this prior art technique requires the utilization of an alternate instruction queue.

With reference now to FIG. 3, there is depicted a table 38 which illustrates the manipulation of instruction queue data content in accordance with a first embodiment of the method and system of the present invention. As above, the instruction queue depicted within table 38 begins with a conditional branch instruction (bc), a compare instruction (cmp) and four arithmetic logic unit instructions (alu). Upon detection of the conditional branch instruction, at cycle 1, a request for target instructions for the conditional branch associated with the conditional branch instruction is made at cycle 2. The sequential instructions necessary to continue, in the event the conditional branch is "not taken," remain within the instruction queue at cycle 2. Thereafter, at cycle 3, the target instructions have been retrieved and are transferred into the instruction queue. At this point, the sequential instructions are purged from the instruction queue. By not purging the sequential instructions contained within the instruction queue immediately after predicting that the conditional branch is "taken" in the event an opposite resolution of the compare instruction occurs prior to the retrieval of the target instructions, the sequential instructions within the instruction queue are still present and may be executed without delay.

Thereafter, as indicated at cycle 4, additional target instructions have been loaded into the instruction queue and the compare instruction has propagated to the execute position within the instruction queue. If the compare instruction indicates that the prediction that the conditional branch is "taken" is erroneous, a fetch for the sequential instructions is initiated at cycle 5. Thereafter, at cycle 6, the sequential instructions necessary to continue processing are loaded into the instruction queue and sequential instruction execution initiates at cycle 7. Thus, as will be apparent upon reference to table 38 within FIG. 3, two blank cycles occur within the instruction queue following the compare instruction in the event of a misprediction of the conditional branch instruction.

Figure 4:
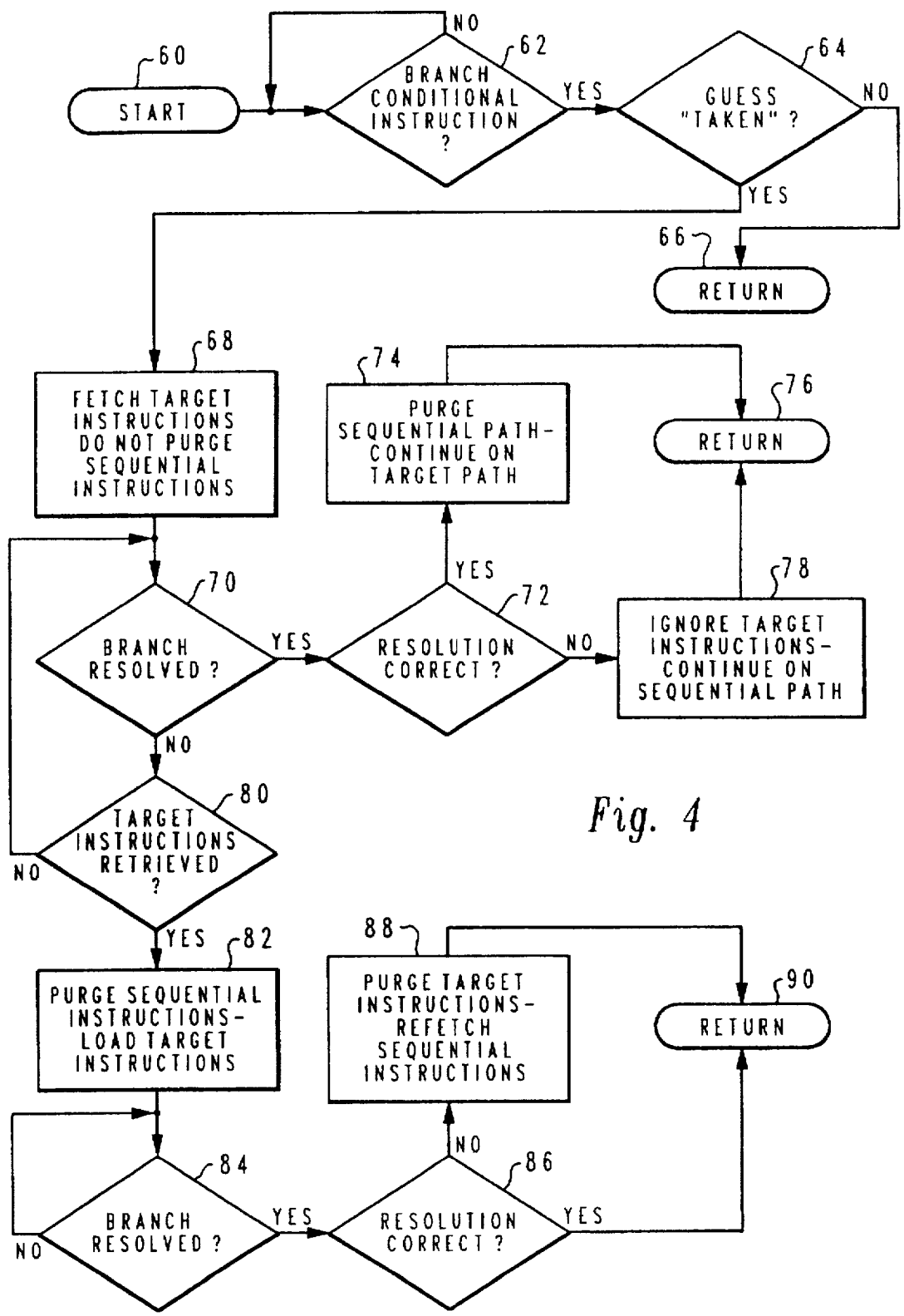
FIG. 4 is a high level logic flowchart illustrating the manipulation of instruction queue content as depicted in FIG. 3 in accordance with the method and system of the present invention.

Referring now to FIG. 4, there is depicted a high level logic flowchart which illustrates the manipulation of instruction queue content as depicted within FIG. 3 in accordance with the method and system of the present invention. As depicted, the process begins at block 60 and thereafter passes to block 62. Block 62 illustrates the determination of whether or not a conditional branch instruction has been encountered within the instruction queue. If not, the process merely iterates until such time as a conditional branch instruction is encountered. Next, the process passes to block 64. Block 64 illustrates a prediction or "guess" that the conditional branch instruction will result in a branch which is "taken." If not, the process passes to block 66 and returns. As described above, those skilled in the art will appreciate that this state within the logic flowchart illustrates the continued processing of the sequential instructions within the instruction queue.

Referring again to block 64, in the event the prediction is made that the conditional branch associated with the conditional branch instruction is "taken," the process passes to block 68. Block 68 illustrates the fetching of the target instructions and indicates that the sequential instructions within the instruction queue are not purged at that time. Thereafter, the process passes to block 70. Block 70 illustrates a determination of whether or not the predicted branch has been resolved. If so, the process passes to block 72. Block 72 depicts a determination of whether or not the predicted resolution was correct. If so, the process passes to block 74 which illustrates the purging of the sequential path and the continuing of the process along the target path associated with the predicted branch. The process then passes to block 76 and returns.

Referring again to block 72, in the event the predicted resolution was incorrect, the process passes to block 78. Block 78 illustrates the ignoring of the target instructions and the continuing of the process along the sequential path. Those skilled in the art will therefore appreciate that by not purging the sequential instructions from the instruction queue upon the occurrence of a prediction, if the branch prediction is resolved as incorrect prior to the retrieval of those instructions, the sequential instructions within the instruction queue may be processed without delay, as illustrated at block 78. Thereafter, the process passes to block 76 and returns.

Referring again to block 70, in the event the branch prediction has not been resolved, the process passes to block 80. Block 80 illustrates a determination of whether or not the target instructions have been retrieved. If not, the process returns to block 70 to once again determine whether or not the predicted branch has been resolved. In this manner, a resolution of the predicted branch which proves the prediction to be incorrect at any time prior to the retrieval of the target instructions may result in the continued execution of the sequential instructions within the instruction queue without incurring any processing delay.

Referring again to block 80, if the target instructions have been retrieved, the process passes to block 82. Block 82 illustrates the purging of the sequential instructions within the instruction queue at that time and the loading of the target instructions. Thereafter, the process passes to block 84. Block 84 illustrates a determination of whether or not the predicted branch has been resolved, and if not, the process merely iterates until such time as the predicted branch will be resolved. Still referring to block 84, in the event the predicted branch is resolved, by the execution of the compare instruction located within the instruction queue prior to the conditional branch instruction, the process passes to block 86. Block 86 illustrates a determination of whether or not the predicted resolution was correct. In the event the predicted resolution was incorrect, as determined at block 86, the process passes to block 88 which illustrates the purging of the target instructions and the refetching of the sequential instructions necessary to continue processing within the previous sequence. Thereafter, the process passes to block 90 and returns. Referring again to block 86, in the event the resolution of the predicted branch was correct, the process passes to block 90 and returns.

With reference now to FIG. 5, there is depicted a table 40 illustrating the manipulation of instruction queue content in accordance with a second embodiment of the method and system of the present invention. As above, table 40 illustrates a conditional branch instruction (bc), a compare instruction (cmp) and four arithmetic logic unit instructions (alu) within the instruction queue at cycle 1. Thereafter, in response to the detection of the conditional branch instruction at cycle 1, the target instructions necessary to follow the conditional branch are requested from the cache. At cycle 3 within table 40, the target instructions have been received at the instruction queue; however, the purging of the sequential instructions within the instruction queue is further delayed until cycle 4. At cycle 4 the compare instruction has progressed from the decode position to the execution position and at that time target instructions T0-T3 are loaded into the instruction queue.

In this embodiment of the present invention the target instructions are retrieved; however, the target instructions are not loaded into the instruction queue and the sequential instructions are not purged until the imminent execution of the first fixed point instruction which follows the conditional branch instruction. That is, the passage of the compare instruction from the decode position to the execute position as depicted at cycle 3 and cycle 4.

Upon the execution of the compare instruction at cycle 4, if the predicted conditional branch is resolved as incorrect, the sequential instructions are fetched at cycle 5 and loaded into the instruction queue at cycle 6. As illustrated, these sequential instructions begin to execute at cycle 7, resulting in a two cycle delay between the compare instruction and the initiation of the execution of sequential instructions following a misprediction of the conditional branch.

Figure 6:
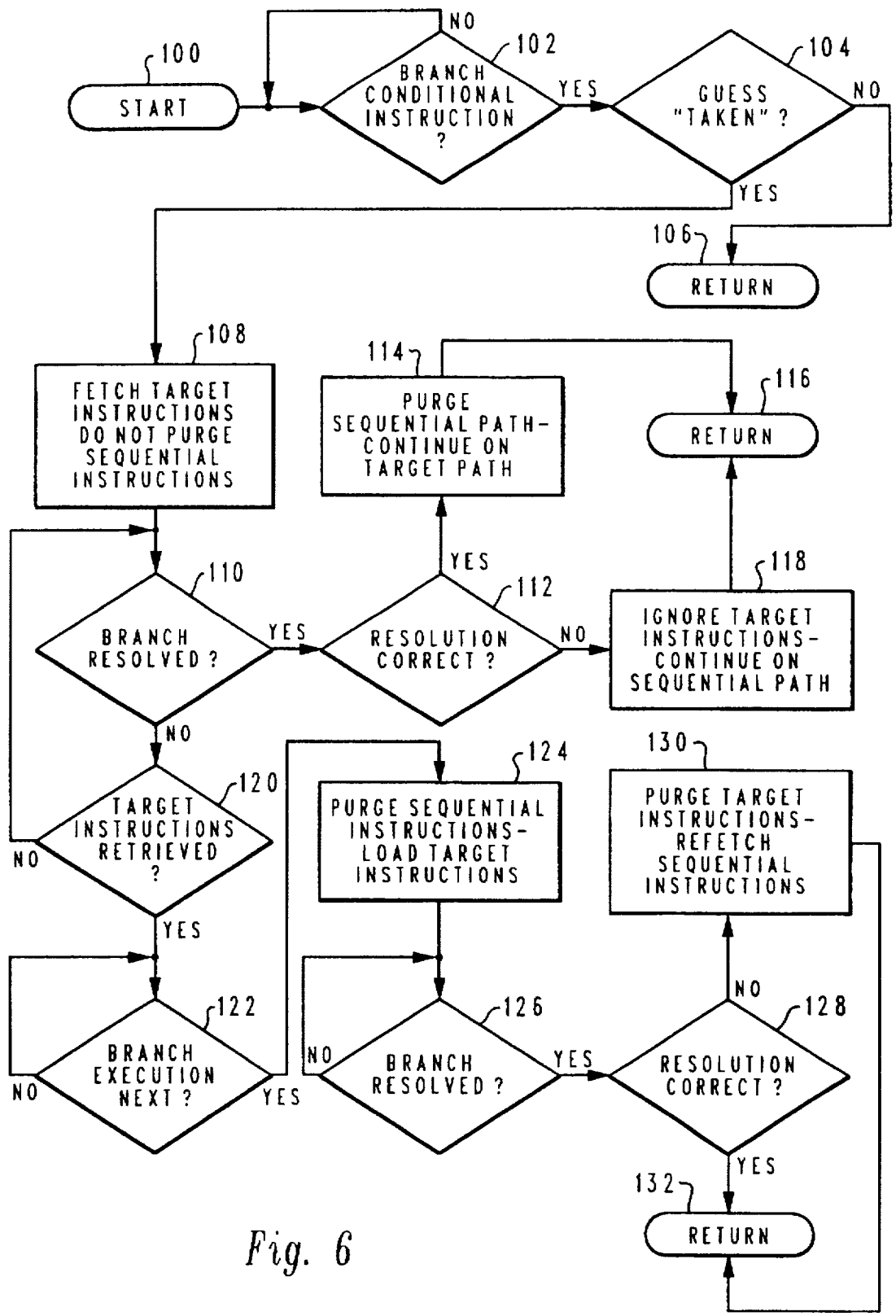
FIG. 6 is a high level logic flowchart illustrating the manipulation of instruction queue content as depicted in FIG. 5 in accordance with the method and system of the present invention.

Referring now to FIG. 6, there is depicted a high level logic flowchart which illustrates the manipulation of instruction queue content as illustrated within FIG. 5, in accordance with the method and system of the present invention. FIG. 6 is substantially identical to FIG. 4 and begins at block 100. Thereafter, the process passes to block 102 which illustrates the detection of a conditional branch instruction within the instruction queue. If no conditional branch instruction is detected, the process merely iterates until such time as a conditional branch instruction is detected. Thereafter, as above, the process passes to block 104 which illustrates a determination of whether or not a prediction is made that the conditional branch is "taken." If not, the process merely passes to block 106 and returns.

Referring again to block 104, in the event a determination is made that the conditional branch is predicted as "taken," the process passes to block 108. Block 108 illustrates the fetching of the target instructions and also illustrates the fact that the sequential instructions within the instruction queue are not purged at this time.

Thereafter, as described above with respect to FIG. 4, the process passes to block 110 which illustrates a determination of whether or not the branch prediction is resolved. If the branch prediction is resolved, the process passes to block 112. Block 112 illustrates a determination of whether or not the resolution indicates that the prediction was correct and if so, the process passes to block 114. Block 114 illustrates the purging of the sequential path and the continuation of the process along the target path. Thereafter, the process passes to block 116 and returns. Still referring to block 112, in the event the resolution indicates the prediction was incorrect, the process passes to block 118. Block 118 depicts the ignoring of the target instructions and the continuing of the process along the sequential path. Thus, as above, in the event the branch prediction is resolved as incorrect prior to the retrieval of the target instructions, block 118 illustrates the continued processing of the sequential instructions without delay.

Referring again to block 110, in the event the branch prediction is not yet resolved, the process passes to block 120. Block 120 illustrates a determination of whether or not the target instructions have been received at the instruction queue and if not, the process returns to block 110 in an iterative fashion. In this manner at any point prior to the retrieval of the target instructions, a branch prediction resolution which indicates that the prediction was incorrect will allow the sequential instructions within the instruction queue to be executed without delay.

Referring again to block 120, in the event the target instructions have been retrieved, the process passes to block 122. Block 122 illustrates the imminent execution of the conditional branch instruction. If execution of the conditional branch instruction is not eminent, the process iterates until such time as the conditional branch instruction execution is imminent. Thereafter, the process passes to block 124. Block 124 illustrates the purging of the sequential instructions and the loading of the target instructions into the instruction queue. Thereafter, the process passes to block 126.

Block 126 depicts a determination of whether or not the branch prediction has been resolved at this time and, if not, the process merely iterates until such time as the branch prediction is resolved. Once the branch prediction is resolved, as determined at block 126, the process passes to block 128. Block 128 illustrates a determination of whether or not the branch prediction was correct and, if not, the process passes to block 130. Block 130 illustrates the purging of the target instructions from the instruction queue and the refetching of the sequential instructions necessary to continue the process. Thereafter, or upon a determination that the branch prediction was correct, the process passes to block 132 and returns.

With reference now to FIG. 7, there is depicted a table 42 which illustrates the manipulation of instruction queue content in accordance with yet a third embodiment of the present invention. As above, table 42 illustrates an initial condition with the instruction queue containing a conditional branch instruction (bc), a compare instruction (cmp) and four arithmetic logic unit instructions (alu). Upon the detection of the conditional branch instruction at cycle 1, a fetch for the target instructions necessary to proceed along the predicted conditional branch is made at cycle 2. At cycle 3 the target instructions have been fetched and the sequential instructions are purged from the instruction queue only upon the successful retrieval of the target instructions. Target instructions T0-T2 are illustrated as loaded within the instruction queue at cycle 3. Additionally, in accordance with this embodiment of the method and system of the present invention, a refetch of the sequential instructions just purged from the instruction queue is initiated at cycle 3. Thereafter, the target instructions within the instruction queue propagate through the instruction queue until cycle 4, when the compare instruction reaches the execute position.

In the event the compare instruction (cmp) indicates that the branch prediction was incorrect, the refetched sequential instructions are loaded into the instruction queue at cycle 5. Thereafter, as depicted at cycle 6 within table 42, the execution of the sequential instructions is initiated. Thus, by purging the sequential instructions within the instruction queue upon the retrieval of the target instructions necessary to process the predicted conditional branch and by immediately refetching the sequential instructions, the effect of misprediction of a conditional branch is reduced to a single blank cycle within the instruction queue. This outcome is identical to the outcome depicted within FIG. 2 in a system which necessitates the utilization of an alternate instruction queue. Thus, those skilled in the art will appreciate upon reference to FIG. 7 that the method and system of the present invention permits minimal run-time delay associated with a misprediction of a conditional branch instruction by manipulating the data within the instruction queue in the manner depicted within FIG. 7.

Figure 8:
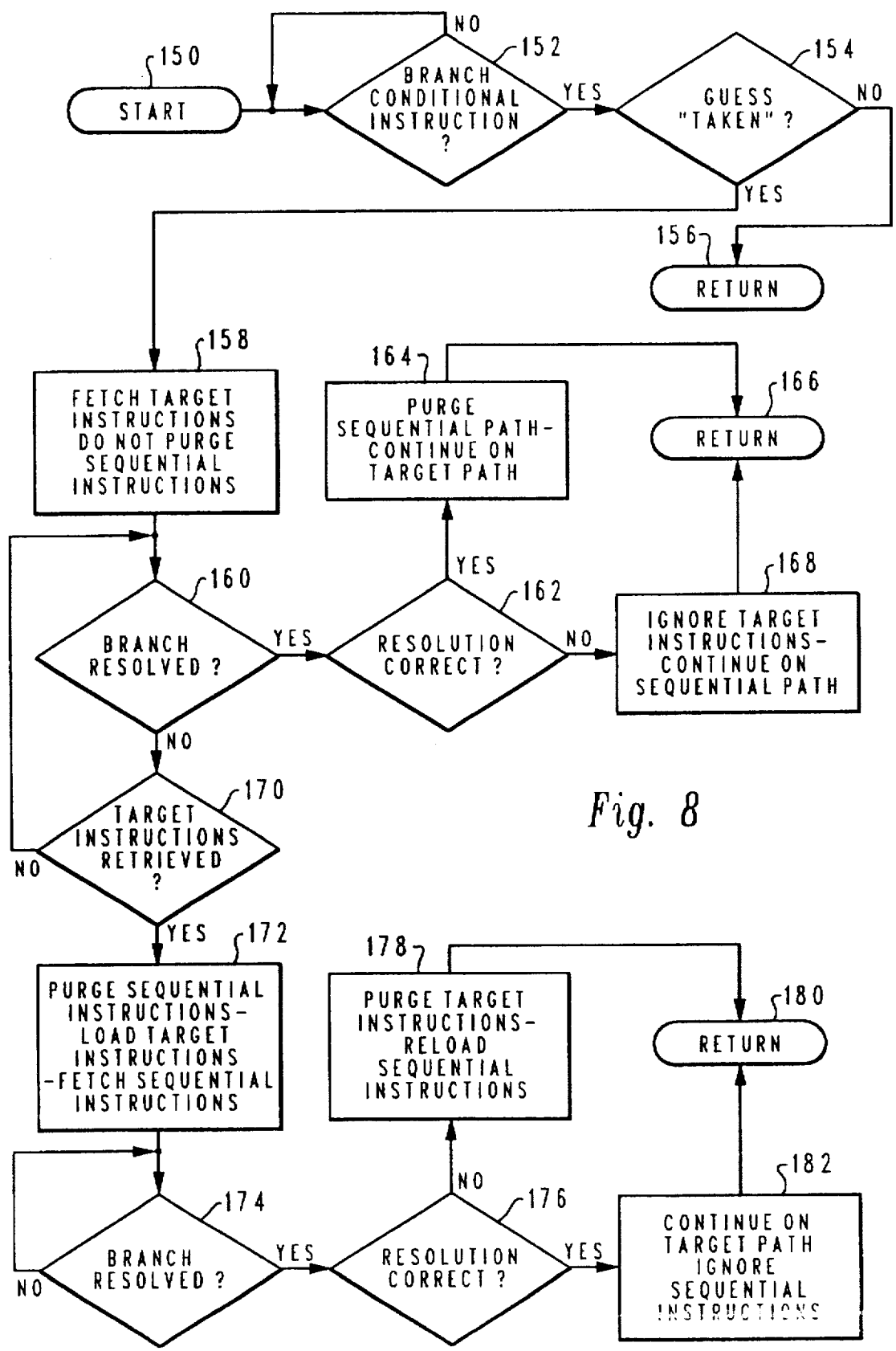
FIG. 8 is a high level logic flowchart illustrating the manipulation of instruction queue content as depicted in FIG. 7 in accordance with the method and system of the present invention.

Finally, referring to FIG. 8, there is depicted a high level logic flow chart which illustrates the manipulation of instruction queue content as depicted within FIG. 7, in accordance with the method and system of the present invention. As above, this process is substantially similar to that depicted within FIGS. 4 and 6. The process begins at block 150 and thereafter passes to block 152. Block 152 illustrates a determination of whether or not a conditional branch instruction has been detected and if not, the process merely iterates until such time as a conditional branch instruction is detected. Upon the detection of a conditional branch instruction, the process passes to block 154. Block 154 illustrates a determination of whether or not a prediction is made that the conditional branch is "taken." If a prediction is not made that the conditional branch is "taken" the process passes to block 156 and returns. Referring again to block 154, in the event a prediction is made that the conditional branch is "taken" the process passes to block 158.

Block 158 illustrates the fetching of the target instructions necessary to proceed along the predicted conditional branch and the fact that the sequential instructions within the instruction queue are not purged at this time. Next, the process passes to block 160. Block 160 illustrates a determination of whether or not the branch prediction has been resolved. If so, the process passes to block 162. Block 162 illustrates a determination of whether or not the resolution indicates the prediction was correct. If so, the process passes to block 164 which depicts the purging of the sequential path and the continuing of the process along the target path. The process then passes to block 166 and returns. Referring again to block 162, in the event the resolution indicates the prediction was not correct, the process passes to block 168 which illustrates the ignoring of the target instructions and the continuing of the process along the sequential path. As described above, this portion of the process illustrates the fact that the sequential instructions within the instruction queue may be executed without delay following a misprediction of the conditional branch instruction which is resolved prior to retrieving the target instructions by delaying the purging of the sequential instruction from the instruction queue.

Referring again to block 160, in the event the branch prediction has not yet been resolved, the process passes to block 170. Block 170 illustrates a determination of whether or not the target instructions have been retrieved. If not, the process returns to block 160 and once again, if the branch prediction is resolved as incorrect, the sequential instructions within the instruction queue may be executed without delay. Referring again to block 170, in the event the target instructions have been successfully retrieved, the process passes to block 172. Block 172 illustrates the purging of the sequential instructions within the instruction queue and the loading of the target instructions into the instruction queue. Block 172 also illustrates the immediate refetching of the sequential instruction.

Next, the process passes to block 174. Block 174 illustrates a determination of whether or not the branch prediction has been resolved and if not, the process merely iterates until such time as the branch prediction is resolved. In the event the branch prediction has been resolved, the process passes to block 176. Block 176 illustrates a determination of whether or not the resolution indicates that the prediction is correct. If not, the process passes to block 178 which illustrates the purging of the target instructions and the reloading of the sequential instructions which were refetched as illustrated within block 172. Thereafter, the process passes to block 180 and returns. Referring again to block 176, in the event the resolution indicates the prediction was correct, the process passes to block 182. Block 182 illustrates the continuing of the process along the target path and the ignoring of the sequential instructions which were refetched, as indicated at block 172. The process then passes to block 180 and returns.

Upon reference to the foregoing those skilled in the art will appreciate that the Applicants herein have described a method and system whereby a conditional branch instruction within a pipelined processor may be predicted as "taken" with a minimal delay penalty for an incorrect prediction, without the necessity of utilizing an alternate instruction queue. As illustrated herein, the misprediction generally is quiet small and may even become eliminated entirely if an arithmetic logic unit instruction is placed between a conditional branch instruction and the compare instruction which initiates the branch. The illustrations contained herein in which the conditional branch instruction immediately follows the compare instruction are clearly worst case scenario.

While the invention has been particularly shown and described with reference to a preferred embodiment, it will be understood by those skilled in the art that various changes in form and detail may be made therein without departing from the spirit and scope of the invention.

We claim:

1. A method in a data processing system for efficiently reducing run-time delays during pipelined processing of instructions stored within said data processing system which include a series of queued sequential instructions and conditional branch instructions wherein each of said conditional branch instructions specifies an associated conditional branch to be taken in response to a selected outcome of processing one or more of said series of sequential instructions, said method comprising the steps of:

detecting a conditional branch instruction within a series of sequential instructions in a queue within said data processing system;

fetching a plurality of target instructions based upon a prediction that a conditional branch associated with said detected conditional branch instruction will be taken; and purging a selected sequence of sequential instructions following said conditional branch instruction within said series in said queue only in response to a successful retrieval of said plurality of target instructions wherein said selected sequence of sequential instructions may be processed without delay in response to a refutation of said prediction prior to retrieval of said plurality of target instructions.

2. The method in a data processing system for efficiently reducing run-time delays during pipelined processing of instructions stored within said data processing system according to claim 1, further including the step of loading said plurality of target instructions into said queue following purging of said selected sequence of sequential instructions.

3. The method in a data processing system for efficiently reducing run-time delays during pipelined processing of instructions stored within said data processing system according to claim 2, further including the step of purging said plurality of target instructions in response to a refutation of said prediction following a loading of said target instructions into said queue.

4. The method in a data processing system for efficiently reducing run-time delays during pipelined processing of instructions stored within said data processing system according to claim 2, further including the step of refetching said selected sequence of sequential instructions following loading of said plurality of target instructions into said queue wherein said selected sequence of sequential instructions may be processed with minimal delay in response to a refutation of said prediction subsequent to a loading of said plurality of target instructions into said queue.

5. A method in a data processing system for efficiently reducing run-time delays during pipelined processing of instructions stored within said data processing system which includes a series of queued sequential instructions and conditional branch instructions wherein each of said conditional branch instructions specifies an associated conditional branch to be taken in response to a selected outcome of processing one or more of said series of sequential instructions, said method comprising the steps of:

detecting a conditional branch instruction within a series of sequential instructions in a queue within said data processing system;

fetching a plurality of target instructions based upon a prediction that a conditional branch associated with said detected conditional branch instruction will be taken; and purging a selected sequence of sequential instructions following said conditional branch instruction within said series in said queue only in response to a successful retrieval of said plurality of target instructions and an imminent execution a first fixed point instruction which follows said conditional branch instruction wherein said selected sequence of sequential instructions may be processed without delay in response to a refutation of said prediction prior to execution of said conditional branch instruction.

6. The method in a data processing system for efficiently reducing run-time delays during pipelined processing of instructions stored within said data processing system according to claim 5, further including the step of loading said plurality of target instructions into said queue following purging of said selected sequence of sequential instructions.

7. The method in a data processing system for efficiently reducing run-time delays during pipelined processing of instructions stored within said data processing system according to claim 6, further including the step of purging said plurality of target instructions in response to a refutation of said prediction following a loading of said target instructions into said queue.

8. The method in a data processing system for efficiently reducing run-time delays during pipelined processing of instructions stored within said data processing system according to claim 6, further including the step of refetching said selected sequence of sequential instructions following loading of said plurality of target instructions into said queue wherein said selected sequence of sequential instructions may be processed with minimal delay in response to a refutation of said prediction subsequent to a loading of said plurality of target instructions into said queue.

9. A data processing system for efficiently reducing run-time delays during pipelined processing of instructions stored within said data processing system which include a series of queued sequential instructions and conditional branch instructions wherein each of said conditional branch instructions specifies an associated conditional branch to be taken in response to a selected outcome of processing one or more of said series of sequential instructions, said data processing system comprising:

means for detecting a conditional branch instruction within a series of sequential instructions in a queue within said data processing system;

means for fetching a plurality of target instructions based upon a prediction that a conditional branch associated with said detected conditional branch instruction will be taken; and means for purging a selected sequence of sequential instructions following said conditional branch instruction within said series in said queue only in response to a successful retrieval of said plurality of target instructions wherein said selected sequence of sequential instructions may be processed without delay in response to a refutation of said prediction prior to retrieval of said plurality of target instructions.

10. The data processing system for efficiently reducing run-time delays during pipelined processing of instructions stored within said data processing system according to claim 9, further including means for loading said plurality of target instructions into said queue following purging of said selected sequence of sequential instructions.

11. The data processing system for efficiently reducing run-time delays during pipelined processing of instructions stored within said data processing system according to claim 10, further including means for refetching said selected sequence of sequential instructions following loading of said plurality of target instructions into said queue wherein said selected sequence of sequential instructions may be processed with minimal delay in response to a refutation of said prediction subsequent to a loading of said plurality of target instructions into said queue.

12. The data processing system for efficiently reducing run-time delays during pipelined processing of instructions stored within said data processing system according to claim 9, further including means for purging said plurality of target instructions in response to a refutation of said prediction following a loading of said target instructions into said queue.

13. A data processing system for efficiently reducing run-time delays during pipelined processing of instructions stored within said data processing system which include a series of queued sequential instructions and conditional branch instructions wherein each of said conditional branch instructions specifies an associated conditional branch to be taken in response to a selected outcome of processing one or more of said series of sequential instructions, said data processing system comprising:

means for detecting a conditional branch instruction within a series of sequential instructions in a queue within said data processing system;

means for fetching a plurality of target instructions based upon a prediction that a conditional branch associated with said detected conditional branch instruction will be taken; and means for purging a selected sequence of sequential instructions following said conditional branch instruction within said series in said queue only in response to a successful retrieval of said plurality of target instructions and an imminent execution of said conditional branch instruction wherein said selected sequence of sequential instructions may be processed without delay in response to a refutation of said prediction prior to execution of said conditional branch instruction.

14. The data processing system for efficiently reducing run-time delays during pipelined processing of instructions stored within said data processing system according to claim 13, further including means for loading said plurality of target instructions into said queue following purging of said selected sequence of sequential instructions.

15. The data processing system for efficiently reducing run-time delays during pipelined processing of instructions stored within said data processing system according to claim 14, further including means for purging said plurality of target instructions in response to a refutation of said prediction following a loading of said target instructions into said queue.

16. The data processing system for efficiently reducing run-time delays during pipelined processing of instructions stored within said data processing system according to claim 14, further including means for refetching said selected sequence of sequential instructions following loading of said plurality of target instructions into said queue wherein said selected sequence of sequential instructions may be processed with minimal delay in response to a refutation of said prediction subsequent to a loading of said plurality of target instructions into said queue.

\* \* \* \* \*